United States Patent [19]
Tanaka

[11] Patent Number: 5,534,929
[45] Date of Patent: Jul. 9, 1996

[54] DATA PROCESSING APPARATUS

[75] Inventor: Mitsugu Tanaka, Kawasaki, Japan

[73] Assignee: Canon Kabushiki Kaisha, Tokyo, Japan

[21] Appl. No.: 269,361

[22] Filed: Jun. 30, 1994

[30]    Foreign Application Priority Data

Jul. 6, 1993  [JP]  Japan .................... 5-166681

[51] Int. Cl.⁶ ........................................ H04N 7/50
[52] U.S. Cl. .................... 348/405; 348/419; 348/423
[58] Field of Search ......................... 348/405, 419, 348/423; H04N 7/133, 7/50

[56]    References Cited

U.S. PATENT DOCUMENTS 5,144,424  9/1992  Savatier .................... 348/405
5,396,497  3/1995  Veltman .................... 348/423

*Primary Examiner*—Howard W. Britton
*Attorney, Agent, or Firm*—Fitzpatrick, Cella, Harper & Scinto

[57]    ABSTRACT

A data processor in which input image data is coded by a coder, with the coded image data being stored in a memory. A controller controls a data amount of the coded image data which is output from the coder by comparing a predetermined set value and a data occupation ratio of the memory. The set value is changed in accordance with a transmission rate used when transmitting the coded image data. Audio data may be multiplexed with the output coded image data, with the timing of providing the audio data to the multiplexer being adjusted in accordance with the transmission rate.

20 Claims, 10 Drawing Sheets

| TRANSMISSION RATE | BUFFER CAPACITY | DATA OCCUPATION AMOUNT | LATENCY DELAY TIME |
|---|---|---|---|
| 100Mbps | 2000Mbit | 1000Mbit | 10sec |
| 50Mbps | 1000Mbit | 500Mbit | 10sec |
| 10Mbps | 200Mbit | 100Mbit | 10sec |

| FIG. 3A | FIG. 3B |

| FIG. 7A | FIG. 7B |

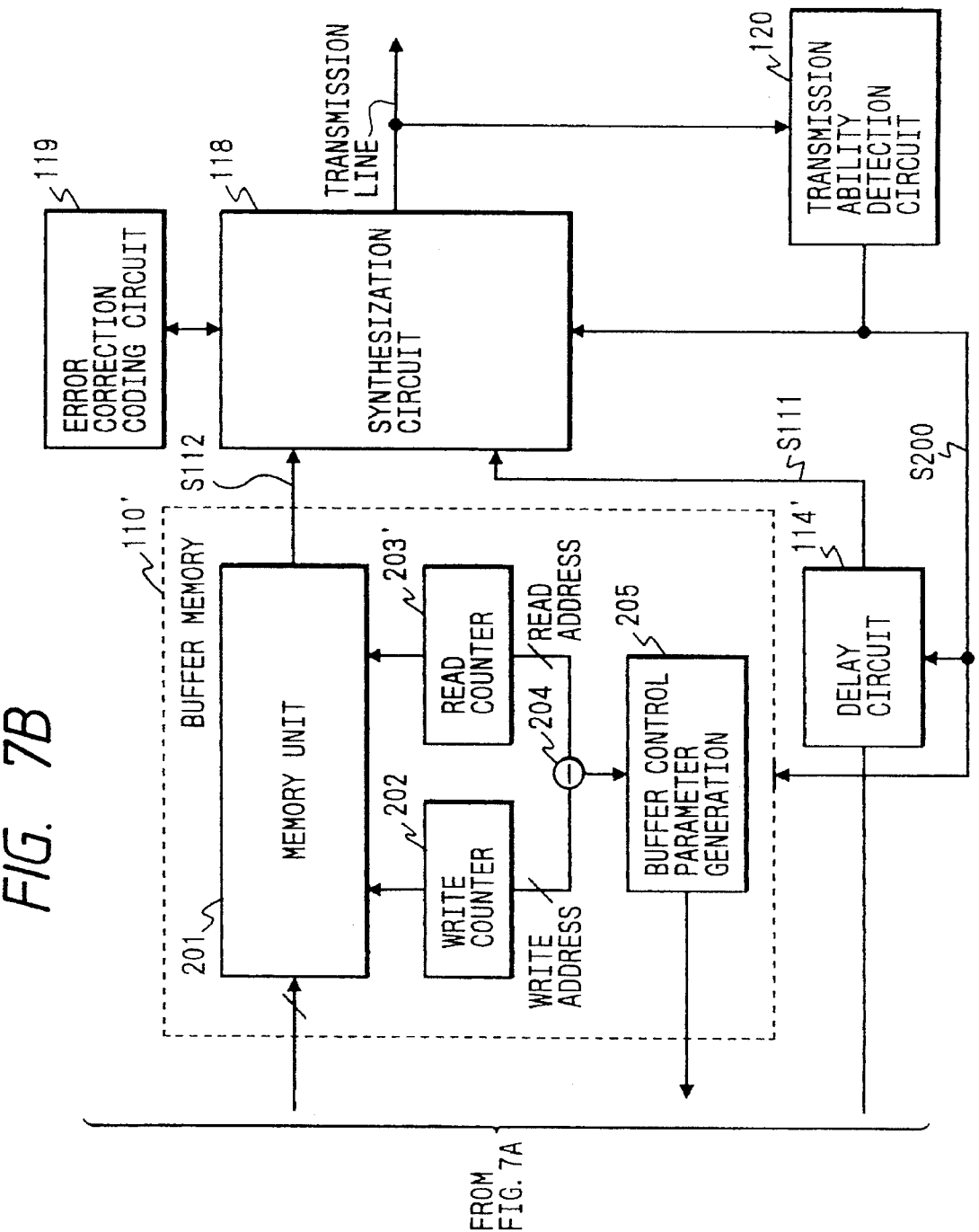

DATA PROCESSING APPARATUS

BACKGROUND OF THE INVENTION

1. Field of the Invention

The present invention relates to a data processing apparatus and, more particularly, to a data processing apparatus for processing a plurality of kinds of data of different processing speeds such as image and audio data.

2. Related Background Art

In a television conference or a television telephone, an image, particularly, a moving image and an audio signal are simultaneously transmitted. In particular, the moving image is compression coded in order to reduce a transmission data amount.

As a compression coding method, a method in which a discrete cosine transformation, a quantization, and a variable length coding in a narrow sense such as a Huffman coding or the like are combined is widely known.

FIG. 1 is a block diagram of a conventional data transmitting apparatus for time division multiplexing an image and an audio signal and transmitting.

A video signal is input to an input terminal 10 and is converted into a digital signal by an A/D converter 12. The digital signal is compression coded by a signal processing circuit 14.

A code amount of data which is generated by the signal processing circuit 14 fluctuates in accordance with a picture pattern of the image of the video signal which is input to the input terminal 10.

The code amount of data which is output from the signal processing circuit 14 is adjusted in accordance with a data accumulation amount (data occupation ratio) in a buffer memory 16.

That is, a latency data amount in the buffer memory 16 is fed back to the signal processing circuit 14 through a feedback path 18.

The signal processing circuit 14 adjusts the amount of codes which are generated in a manner such that the latency data amount in the buffer memory 16 lies within a predetermined range, in other words, an overflow of the storage data doesn't occur in the buffer memory 16.

On the other hand, an analog audio signal is supplied from an input terminal 20 to an A/D converter 22 and is converted into a digital signal.

A signal processing circuit 24 executes a predetermined process for transmission, for example, a pulse code modulation (PCM) to the audio data which is output from the A/D converter 22.

A delay circuit 26 delays an output of the signal processing circuit 24 by a predetermined time and supplies the delayed signal to a (b) contact of a switch 28. An output of the buffer memory 16 is supplied to an (a) contact of the switch 28.

The information data which is time division multiplexed by the switch 28 is output to a transmission path from an output terminal 30.

The operation in the buffer memory 16 will be briefly explained with reference to FIG. 2.

A capacity of the buffer memory is set to Bc, a data rate on the writing side is set to Dw, a data rate on the reading side is set to Dr, and a target data occupation ratio is set to ½ in consideration of a response speed of the feedback path 18.

Since the data rate Dr on the reading side corresponds to a transmission rate, it is generally constant. The data rate Dw on the writing side fluctuates around Dr as a center due to the feedback control by the feedback path 18. A data latency delay time of the buffer memory 16 is equal to Bc/Dw (or Bc/Dr).

In case of executing a data amount control as mentioned above, since the image data passes once through the buffer memory, a latency delay time occurs and a time deviation occurs between the image data and the audio data.

For example, when there is a possibility such that the transmission rate changes as in the case of using transmission media of different transmission rates or a transmission medium such that a plurality of transmission rates can be selected, a fluctuation range of the time deviation between the audio data and the image data increases.

SUMMARY OF THE INVENTION

Under such circumstances, it is an object of the invention to provide a data processing apparatus in which, in case of processing a plurality of kinds of information data of different processing speeds, a time deviation between the information data which occurs when a transmission rate changes is effectively suppressed.

According to one preferred embodiment of the invention, the above object is accomplished by a data processing apparatus comprising: coding means for coding information data which is input; memory means for storing the information data coded by the coding means; control means for controlling a data amount of information data which is output from the coding means in accordance with a data occupation ratio of the memory means; and change means for changing a real capacity of the memory means in accordance with a transmission rate when transmitting the coded information data.

According to another preferred embodiment, there is provided a data processing apparatus comprising: coding means for coding information data which is input; memory means for storing the information data coded by the coding means; control means for controlling a data amount of the information data which is output from the coding means in accordance with a data occupation ratio of the memory means, in which the control means controls the data amount by comparing a predetermined set value and the data occupation ratio; and change means for changing the set value in accordance with a transmission rate when transmitting the coded information data.

According to still another preferred embodiment, there is provided a data processing apparatus comprising: coding means for coding first information data which is input; memory means for storing the first information data coded by the coding means; control means for controlling a data amount of the information data which is output from the memory means in accordance with a data occupation ratio of the memory means; multiplexing means for multiplexing second information data to the first information data which is output from the memory means; and adjusting means for adjusting a timing for outputting the second information data to the multiplexing means in accordance with a transmission rate when transmitting the multiplexed data.

Other objects, features, and advantages of the invention will become apparent from the following detailed description taken in conjunction with the accompanying drawings.

DETAILED DESCRIPTION OF THE PREFERRED EMBODIMENTS

An embodiment of the present invention will now be described hereinbelow with reference to the drawings.

Figure 3:
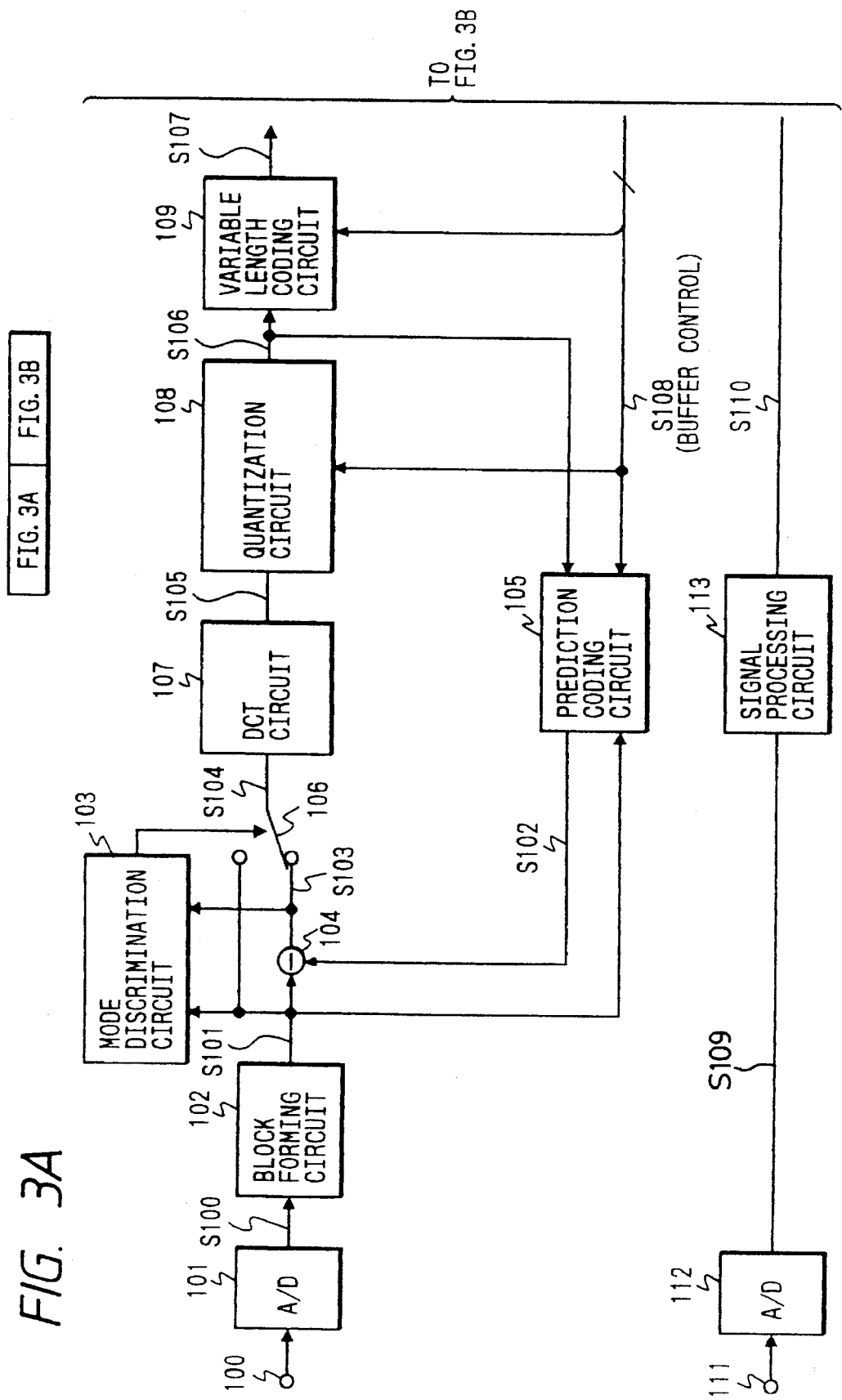
FIG. 3 which is comprised of FIGS. 3A and 3B is a block diagram of a coding apparatus of a first embodiment according to the invention.
Figure 3B:
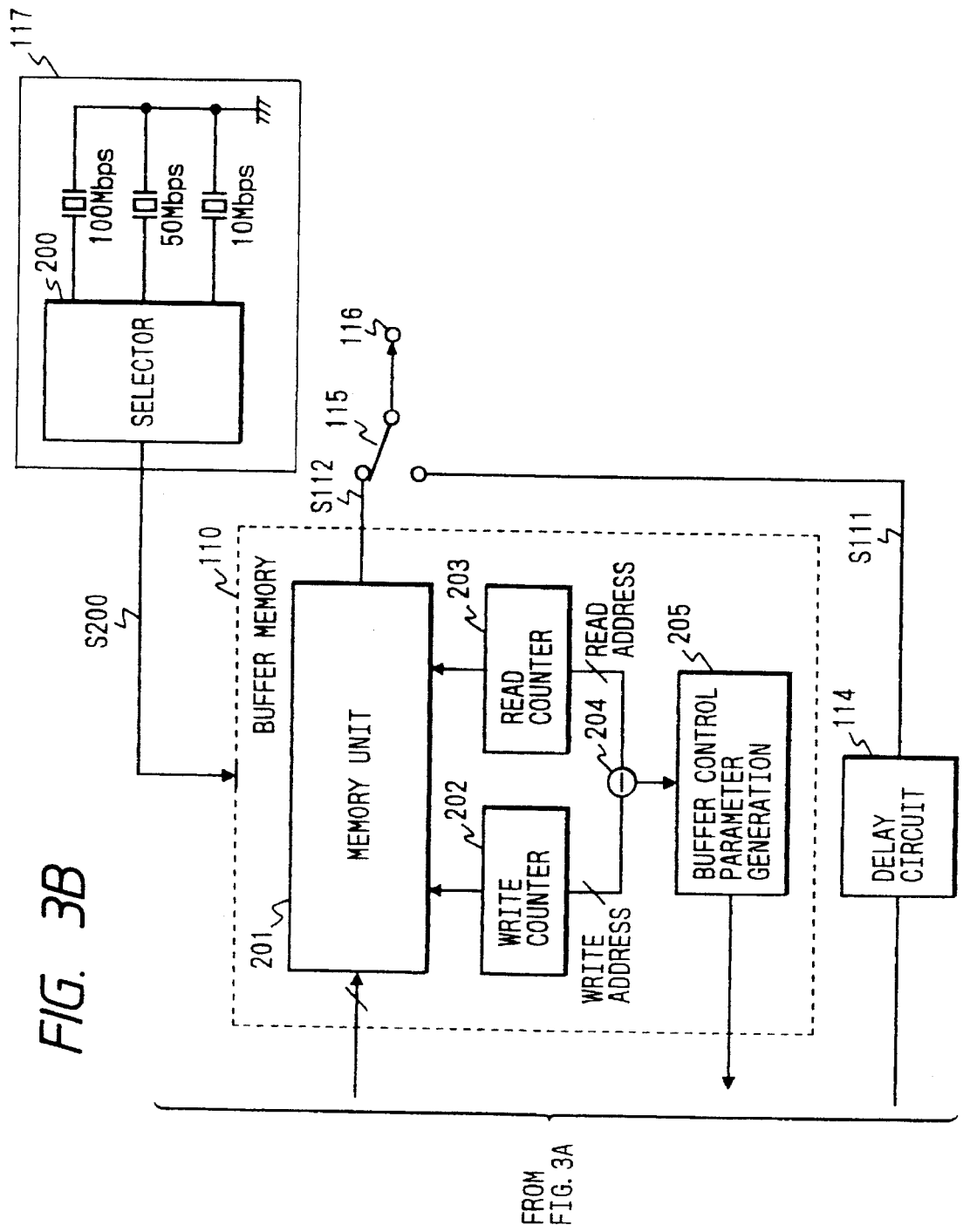

FIGS. 3A and 3B are a block diagram of a coding apparatus of an embodiment of the invention.

In FIGS. 3A and 3B, a video signal is input from a video input terminal 100. The video signal input from the video input terminal 100 is converted into a digital video signal by an A/D converting circuit 101.

A converted digital video signal S100 is supplied to a block forming circuit 102.

The block forming circuit 102 forms blocks from the input digital video signal on an (8×8) pixel unit basis.

Further, block data S101 (hereinafter, S101 is referred to as a macro block) of a (16×16) pixel unit which is constructed by (8×8) blocks is formed and supplied to a mode discrimination circuit 103, an arithmetic operating circuit 104, and a prediction coding circuit 105.

The mode discrimination circuit 103 calculates a data electric power of differential value data S103 which is obtained by subtracting predictive data S102 that is produced by the prediction coding circuit 105 from the macro block data S101 by the arithmetic operating circuit 104. The circuit 103 also calculates a data electric power of the macro block data S101. The macro block data S103 of the smaller electric power (namely, data of a small generation information amount) is selected by a switch 106 and supplied to a discrete cosine transforming circuit (DCT circuit) 107.

In this case, when the following coding process is executed by the macro block data S101, this means that intraframe coding is executed. When the following coding process is executed by the differential value data S103, this means that interframe coding is executed.

That is, in the embodiment, either one of intraframe coding and interframe coding is selected on a macro block unit basis.

The DCT circuit 107 DCT converts data S104 selected by the mode discrimination circuit 103 on an (8×8) block unit basis.

DCT converted data S105 is supplied to a quantization circuit 108 and quantized by the quantization circuit 108, so that quantization data S106 is output.

As for the quantization data S106, since a variable length coding circuit 109 executes a variable length coding process to input data, an amount of data which is generated every macro block differs.

Transmission data S107 to which a flag which can discriminate an emphasis of the generation data of each macro block was added is supplied to a buffer memory 110.

Buffer control data S108 is supplied from the buffer memory 110 to the prediction coding circuit 105 and quantization circuit 108. There is executed a buffer control for controlling a quantization step by feeding back the data to the quantization circuit 108 and an inverse quantization circuit (not shown) in the prediction coding circuit 105 in a manner such that an amount of data which is accumulated into the buffer memory 110 is equal to a predetermined data amount (a data occupation ratio of the buffer memory 110 is set to a predetermined value) by the buffer control data S108.

Transmission rate data S200 from a rate detection circuit 117 to detect a transmission rate of a transmission medium which is used is input to the buffer memory 110. The operation to the buffer memory 110 by the rate detection circuit 117 will be described hereinlater.

On the other hand, an audio signal is input from an audio input terminal 111 and is converted into a digital audio signal S109 by an A/D converting circuit 112.

The digital audio signal S109 is provided to a signal processing circuit 113 for signal processing. As a signal process, audio data corresponding to a frame interval of the video signal is subjected to an interleaving process or the like.

Signal processed audio data S110 output from signal processing circuit 113 is supplied to a delay circuit 114 for delaying the data by a predetermined time (for instance, ten seconds). Delayed audio data S111 is supplied to a switch 115.

The switching operation of the switch 115 is controlled on the basis of a signal Sv which is output from the variable length coding circuit 109.

The signal Sv indicates a signal to discriminate a vertical blanking period of the video signal.

Namely, as for the delayed audio data S111, the audio data corresponding to a frame period of the video signal is time division multiplexed to coding data S112 which is output from the buffer memory 110 through the switch 115 for a vertical blanking period of the video signal. Image data and audio data are output from a transmission output terminal 116 to a transmission path.

The operation to the buffer memory 110 by the rate detection circuit 117 will now be described hereinbelow.

In the embodiment, it is assumed that 100 Mbps, 50 Mbps, and 10 Mbps can be selected as transmission rates.

A selector 200 of the rate detection circuit 117 selects a timing clock for transmission and supplies selected value information S200 to the buffer memory 110.

It is now assumed that the total capacity of the buffer memory 110 is equal to 2,000 Mbits.

For example, the buffer memory 110 is of the FIFO type. A write address counter 202 generates a write address of a memory unit 201 and a read address counter 203 generates a read address.

Figures 2, 4:
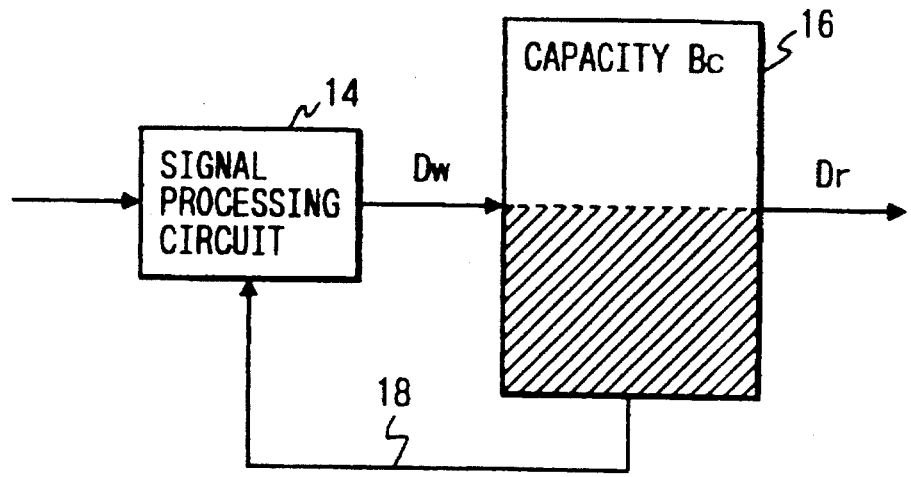
FIG. 2 is a diagram for explaining a code amount control by a buffer memory 16 in FIG. 1.
FIG. 4 shows a correspondence table of a transmission rate and a buffer capacity in FIG. 1.

As shown in a table of FIG. 4, the buffer memory 110 changes a use capacity, namely, a real capacity of the memory unit 201 in accordance with the transmission rate information (or transmission timing clock signal) S200 from the rate detection circuit 117.

That is, a capacity of 2,000 Mbits is set for the transmission rate 100 Mbps, 1,000 Mbits for 50 Mbps, and 200 Mbits for 10 Mbps.

Such a capacity control can be easily realized by changing reset values of the write address counter 202 and read address counter 203 in accordance with the selected value information S200.

A subtracter 204 subtracts the read address from the write address and supplies the resultant value to a buffer control parameter generation section 205.

On the basis of an output from the subtracter 204, the buffer control parameter generation section 205 judges an amount of coding data S107 accumulated in the memory unit 201 and generates the buffer control data S108 to control quantization steps.

In the embodiment, an amount of codes which are generated when the video signal is coded is adjusted by controlling the quantization steps in a manner such that the data occupation ratio of the buffer memory 110 is set to ½.

Due to this, as shown in FIG. 4, the latency delay time in the buffer memory 110 is constant irrespective of the transmission rate and is set to ten seconds.

Since such a latency delay time coincides with the delay time of the delay circuit 114, a time deviation between the video image and the audio signal doesn't occur at a time point of the time division multiplex by the switch 115.

In FIGS. 3A and 3B, by adjusting the real capacity of the buffer memory 110 in a state in which the data occupation ratio is set to be constant for the transmission rate, the latency delay time in the buffer memory 110 has been controlled to the constant value irrespective of the transmission rate. However, by adjusting the data occupation ratio for the transmission rate while using the total capacity of the buffer memory 110, the latency delay time in the buffer memory 110 can be also controlled to a constant value irrespective of the transmission rate.

As a method of adjusting the occupation ratio, it is sufficient to control and set the buffer control parameter generation section 205 in accordance with the selected value information S200.

For example, the data occupation ratio is set to ½ for the transmission rate 100 Mbps, ¼ for 50 Mbps, and ¹⁄₂₀ for 10 Mbps. As already shown as an example, when it is now assumed that the total capacity of the buffer memory 110 is set to 2,000 Mbits, the latency delay time of the buffer memory 110 is equal to ten seconds for all of the transmission rates of 100 Mbps, 50 Mbps, and 10 Mbps.

Figure 1:
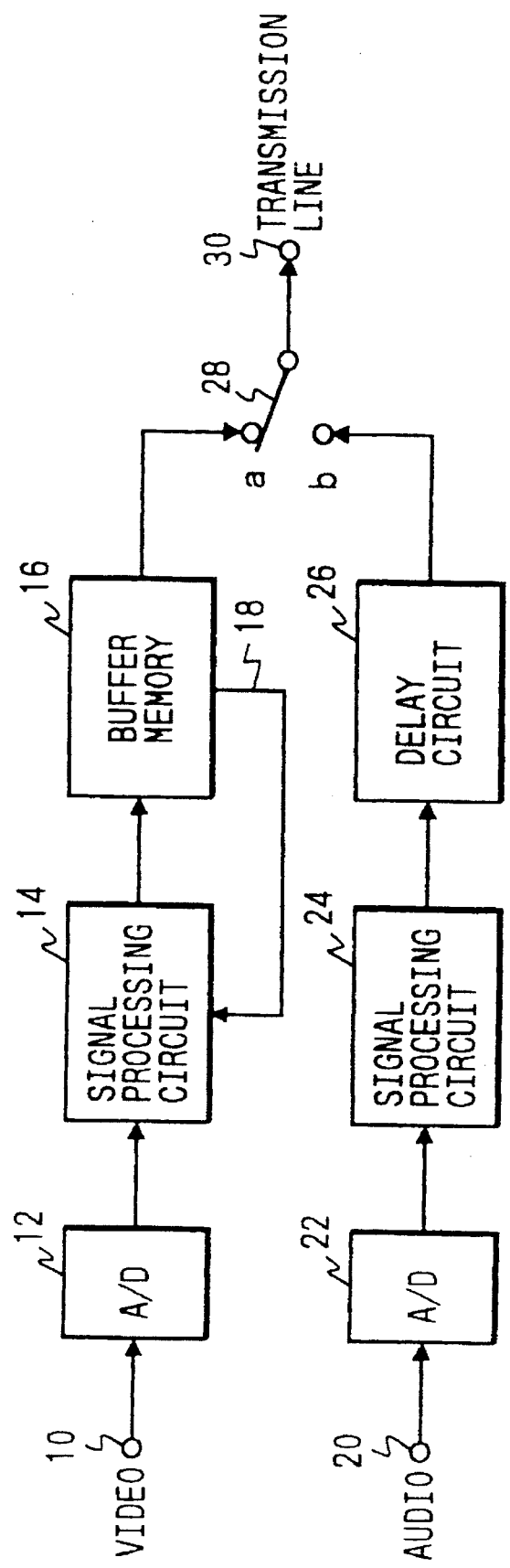
FIG. 1 is a block diagram of a conventional data transmitting apparatus for time division multiplexing an image and an audio signal and for transmitting the multiplexed signal.

As mentioned above, in the embodiment shown in FIG. 1, by adjusting the real capacity of the buffer memory 110 or the data occupation ratio in accordance with the transmission rate, the latency delay time can be controlled to a constant value irrespective of the transmission rate.

Therefore, the time deviation between the video image and the audio signal can be remarkably suppressed.

A coding apparatus of the second embodiment will now be described hereinbelow with reference to FIGS. 5A and 5B.

In the first embodiment, in place of adjusting the buffer memory 110, a delay time of a delay circuit 114' is adjusted and controlled to the time corresponding to the latency delay time in the buffer memory 110 in accordance with the transmission rate.

Figure 5:
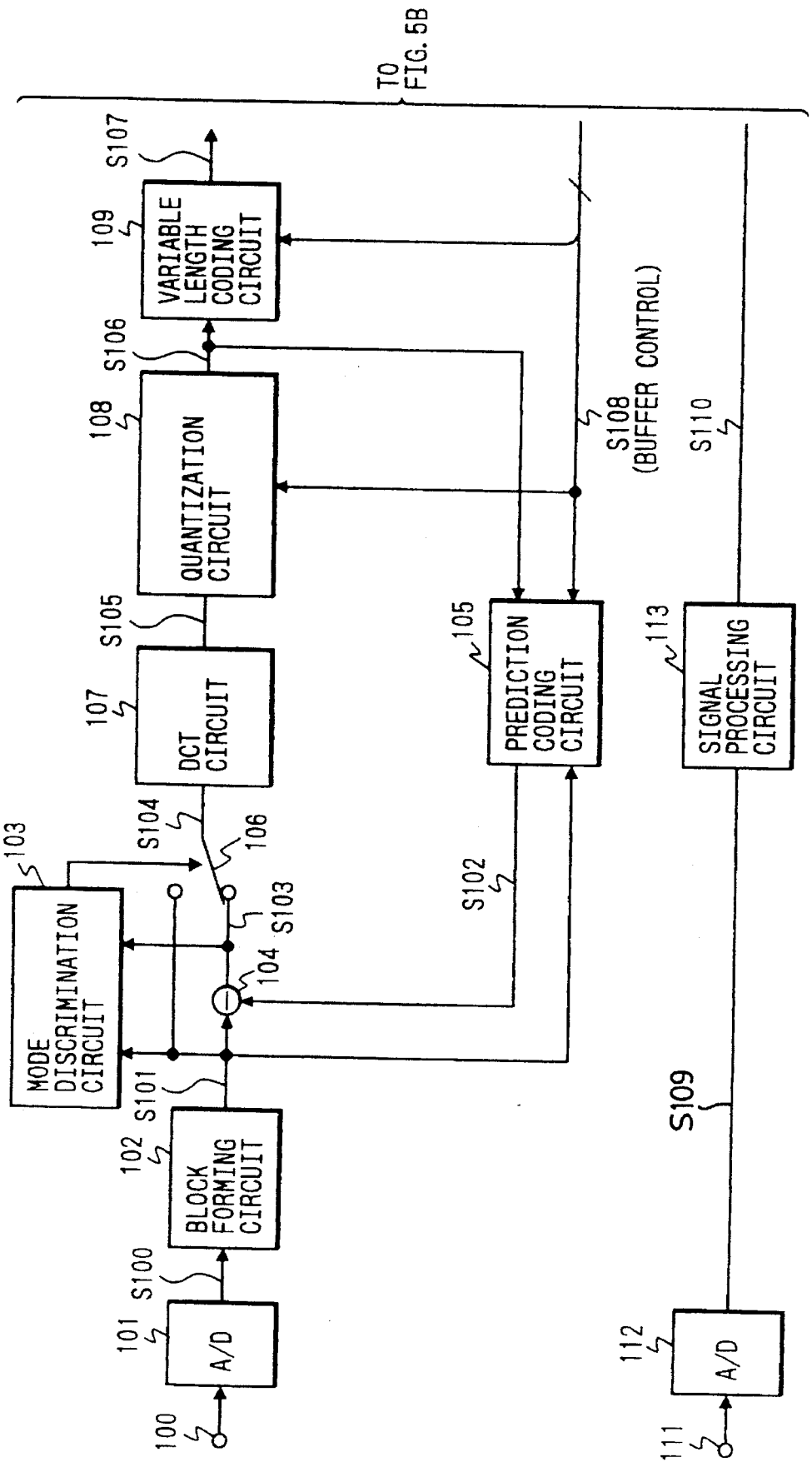
FIG. 5 which is comprised of FIGS. 5A and 5B is a block diagram of a coding apparatus of a second embodiment of the invention.
Figure 5B:
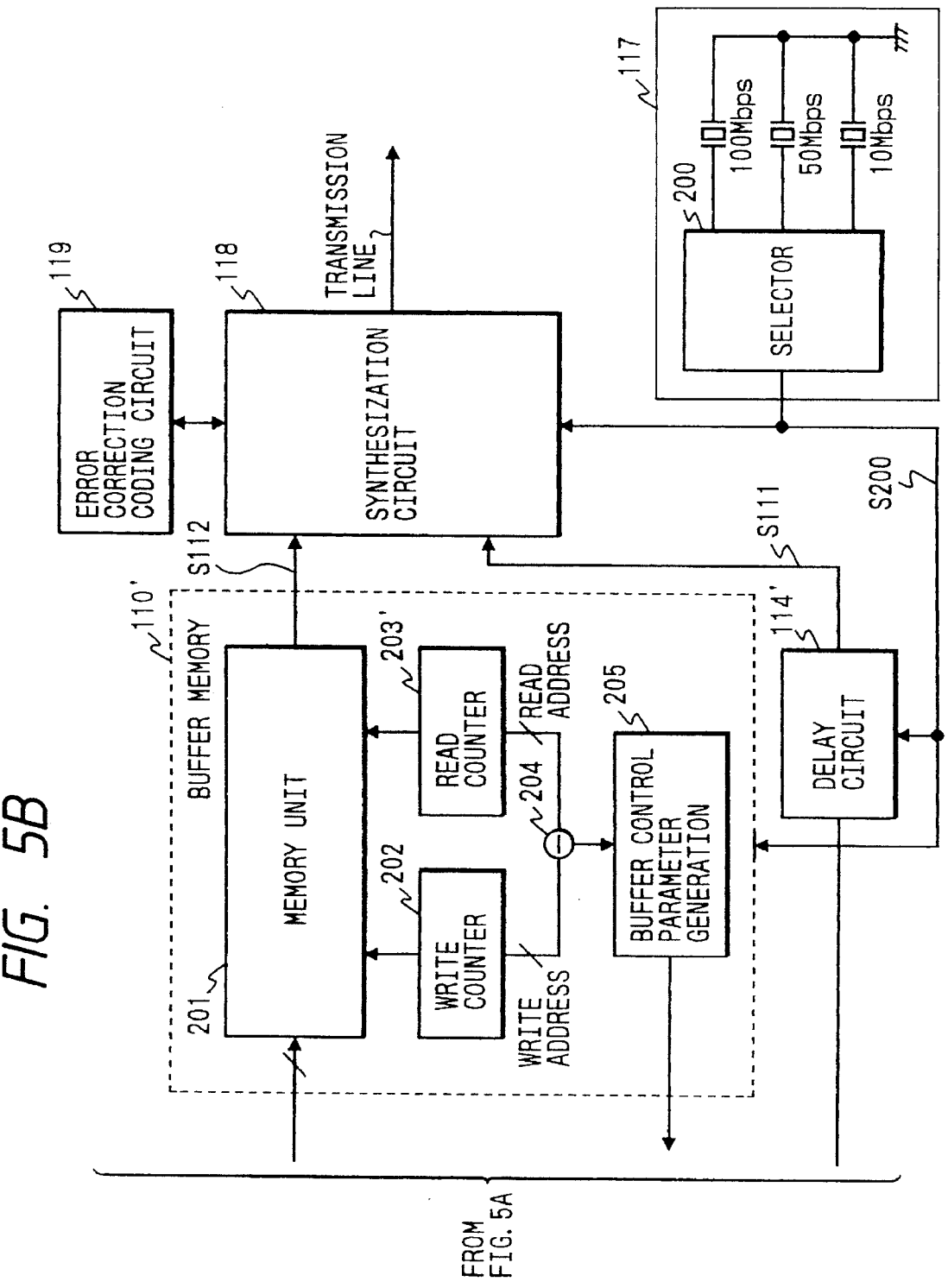

FIGS. 5A and 5B are a block diagram of the second embodiment according to the invention in which a delay time of the audio signal is adjusted in accordance with the transmission rate. In FIGS. 5A and 5B, the portions corresponding to those shown in FIGS. 3A and 3B are designated by the same reference numerals and their descriptions are omitted here.

In FIGS. 5A and 5B, a read address counter 203' of a buffer memory 110' generates a read address at a clock speed according to the transmission rate information S200 from the rate detection circuit 117.

The control to change the data capacity in accordance with the transmission rate as in the first embodiment is not performed for the buffer memory 110' but the data capacity is held to a constant value. Moreover, the data occupation ratio is also set to a constant value of ½. Therefore, the latency delay time in the buffer memory 110' is converted in accordance with the transmission rate.

For example, now assuming that the total capacity of the buffer memory 110' is set to 2,000 Mbits and a target value of the data occupation ratio is set to ½, the latency delay time is set to 10 seconds for the transmission rate of 100 Mbps, 20 seconds for 50 Mbps, and 100 seconds for 10 Mbps.

In the embodiment, therefore, a delay time of a delay circuit 114' is adjusted to the time corresponding to the latency delay time in the buffer memory 110'.

That is, in accordance with the transmission rate information S200 from the selector 200 of the rate detection circuit 11, the delay circuit 114' delays the input signal by 10 seconds for the transmission rate of 100 Mbps, by 20 seconds for 50 Mbps, and 100 seconds for 10 Mbps. The delay circuit 114' outputs the delayed signal to a synthesization circuit 118.

Such a delay circuit which can freely change the delay time can be easily realized by using a digital memory, for instance, a FIFO memory.

The synthesization circuit 118 synthesizes an output (coding data S112) of the buffer memory 110' and an output (audio data S111) of the delay circuit 114'.

An error correction code to correct an error code which is generated in the transmission path is added to the synthesized information data by an error correction coding circuit 119 and the resultant data is sent to the transmission path.

In the second embodiment, by adjusting the delay time of the audio data in accordance with the transmission rate, the time deviation between the video image and the audio signal can be suppressed.

The invention can be embodied by other various modifications without departing from the spirit and main features of the invention.

For example, although a plurality of transmission rates have previously been provided for the transmission rate detection circuit 117 in the embodiments, it is also possible to consider a construction such that a transmission ability of the transmission path is detected and the buffer memory is controlled or the delay time of the delay circuit is controlled in accordance with the detection result.

Figure 6:
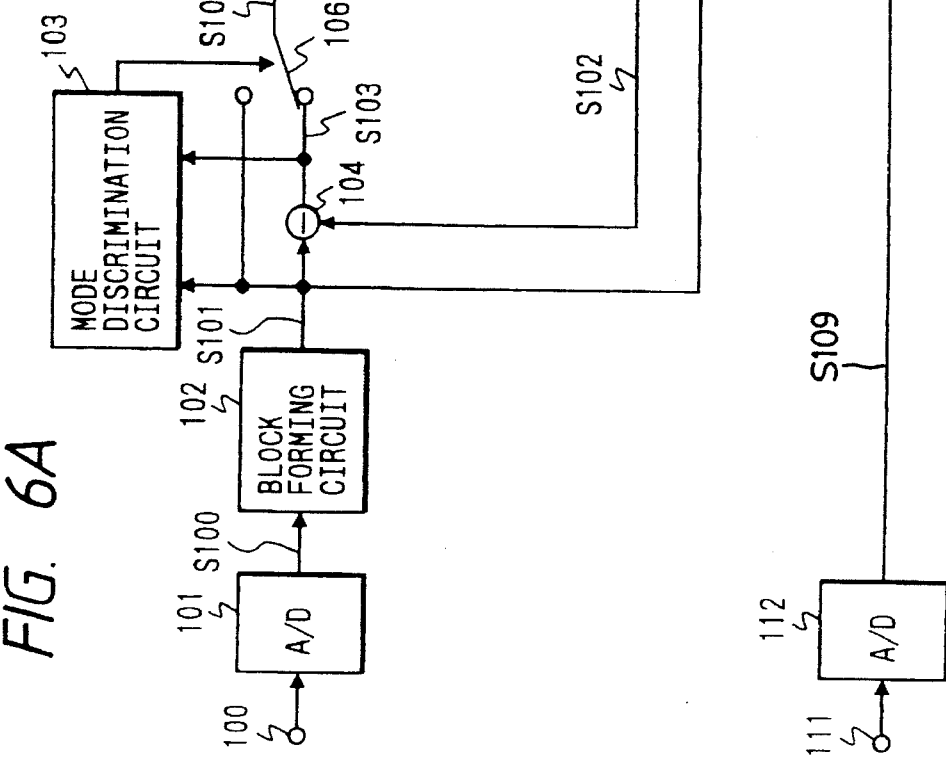
FIG. 6 which is comprised of FIGS. 6A and 6B is a block diagram of a coding apparatus of a third embodiment of the invention.
Figure 6B:
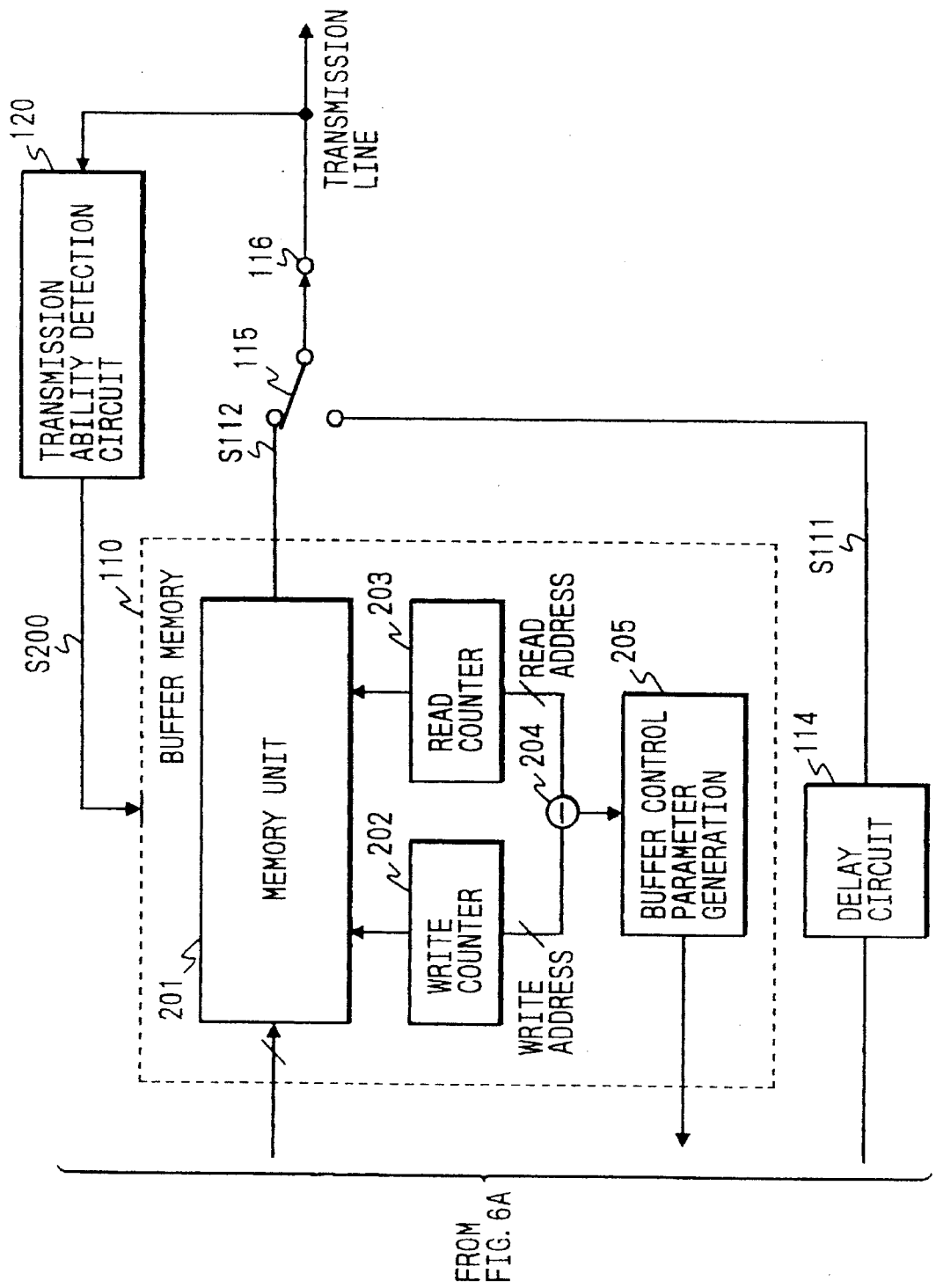
Figures 7, 7A:
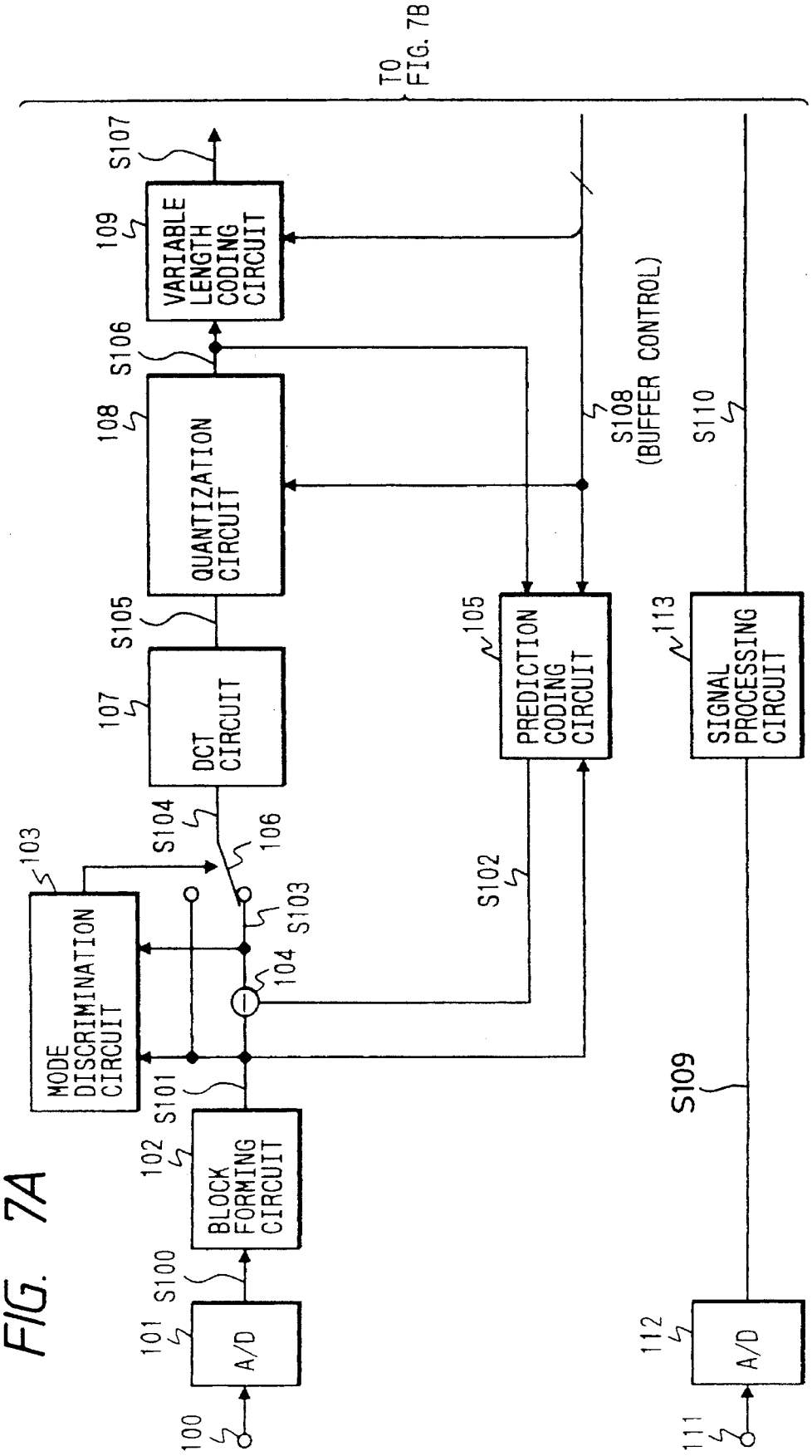
FIG. 7 which is comprised of FIGS. 7A and 7B is a block diagram of a coding apparatus of a fourth embodiment according to the invention.

A specific example is shown in FIGS. 6A and 6B as a third embodiment and is shown in FIGS. 7A and 7B as a fourth embodiment. The apparatuses shown in FIGS. 6A, 6B, 7A and 7B execute processes similar to those described in FIGS. 3A, 3B, 5A and 5B except that an ability of the transmission path is detected by a transmission ability detection circuit 120 and the buffer memory and the delay circuit are controlled in accordance with the detection result.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. A data processing apparatus comprising:
   a) coding means for coding information data which is input;
   b) memory means for storing the coded information data which was coded by said coding means;
   c) control means for controlling a data amount of coded information data which is output from said coding means in accordance with a data occupation ratio of said memory means; and
   d) change means for changing a real capacity of the memory means in accordance with a transmission rate when the coded information data is transmitted.

2. An apparatus according to claim 1, further including detecting means for detecting the transmission rate.

3. An apparatus according to claim 1, wherein the information data is image data.

4. An apparatus according to claim 3, wherein said coding means includes quantizing means for quantizing the information data, and said control means controls quantization steps of said quantizing means.

5. An apparatus according to claim 4, wherein said control means compares a predetermined set value and the data occupation ratio.

6. An apparatus according to claim 4, further including multiplexing means for multiplexing audio data to the coded image data.

7. An apparatus according to claim 6, wherein said multiplexing means multiplexes an audio signal for a vertical blanking period of the image data.

8. A data processing apparatus comprising:
   a) coding means for coding information data which is input;
   b) memory means for storing the coded information data which was coded by said coding means;
   c) control means for controlling a data amount of coded information data which is output from said coding means in accordance with a data occupation ratio of said memory means, in which said control means controls the data amount by comparing a predetermined set value and the data occupation ratio; and
   d) change means for changing the set value in accordance with a transmission rate when the coded information data is transmitted.

9. An apparatus according to claim 8, further including detecting means for detecting the transmission rate.

10. An apparatus according to claim 8, wherein the information data is image data.

11. An apparatus according to claim 10, wherein said coding means has quantizing means for quantizing the information data, and said control means controls quantization steps of said quantizing means.

12. An apparatus according to claim 11, further including multiplexing means for multiplexing audio data to the coded image data.

13. An apparatus according to claim 12, wherein the multiplexing means multiplexes an audio signal for a vertical blanking period of said image data.

14. A data processing apparatus comprising:
   a) coding means for coding first information data which is input;
   b) memory means for storing the coded first information data which was coded by said coding means;
   c) control means for controlling a data amount of coded first information data which is output from said coding means in accordance with a data occupation ratio of said memory means;
   d) multiplexing means for multiplexing second information data to the coded first information data which is output from said memory means; and
   e) adjusting means for adjusting a timing for outputting the second information data to said multiplexing means in accordance with a transmission rate when transmitting the multiplexed data.

15. An apparatus according to claim 14, further including detecting means for detecting the transmission rate.

16. An apparatus according to claim 14, wherein including adjusting means has delay means for delaying the second information data and adjusting a delay time of said delay means.

17. An apparatus according to claim 14, wherein the first information data is image data and the second information data is audio data.

18. An apparatus according to claim 17, wherein said multiplexing means multiplexes an audio signal for a vertical blanking period of the image data.

19. An apparatus according to claim 14, wherein said coding means includes quantizing means for quantizing the first information data, and said control means controls quantization steps of said quantizing means.

20. An apparatus according to claim 19, wherein said control means controls the data amount by comparing a predetermined set value and the data occupation ratio.

* * * * *

UNITED STATES PATENT AND TRADEMARK OFFICE
CERTIFICATE OF CORRECTION

PATENT NO. : 5,534,929

DATED : July 9, 1996

INVENTOR(S) : MITSUGU TANAKA

It is certified that error appears in the above-identified patent and that said Letters Patent is hereby corrected as shown below:

COLUMN 3

Line 27, "a" should be deleted.

COLUMN 7

Line 16, "the" should read --said--.

COLUMN 8

Line 33, "has" should read --having--;
   Line 34, "and" should read --and for--.

Signed and Sealed this

Twenty-second Day of April, 1997

Attest:

BRUCE LEHMAN

*Commissioner of Patents and Trademarks*

*Attesting Officer*